US012646067B2

(12) United States Patent
Karimli et al.

(10) Patent No.: US 12,646,067 B2
(45) Date of Patent: Jun. 2, 2026

(54) THREAT IDENTIFICATION AND MITIGATION SYSTEM USING MACHINE LEARNING

(71) Applicant: T-Mobile USA, Inc., Bellevue, WA (US)

(72) Inventors: Yasmin Karimli, Kirkland, WA (US); Jan Olav Opedal, Ellensburg, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 291 days.

(21) Appl. No.: 18/194,497

(22) Filed: Mar. 31, 2023

(65) Prior Publication Data

US 2024/0330934 A1 Oct. 3, 2024

(51) Int. Cl.
*G06Q 20/40* (2012.01)

(52) U.S. Cl.
CPC ................................. *G06Q 20/4016* (2013.01)

(58) Field of Classification Search
CPC .................................................. G06Q 20/4016
See application file for complete search history.

(56) References Cited

U.S. PATENT DOCUMENTS

| | | | | |
|---|---|---|---|---|
| 11,017,100 | B2 | 5/2021 | Krishnamoorthy et al. | |
| 11,288,673 | B1 * | 3/2022 | Venturelli | G06F 18/214 |
| 11,902,786 | B1 * | 2/2024 | Sharma | H04W 12/35 |
| 12,008,579 | B1 * | 6/2024 | Kumar | G06Q 30/016 |
| 2018/0300625 | A1 * | 10/2018 | Esman, Sr. | G06N 3/045 |
| 2021/0136089 | A1 * | 5/2021 | Costea | H04L 41/22 |

| | | | | |
|---|---|---|---|---|
| 2021/0288968 | A1 | 9/2021 | Legault et al. | |
| 2021/0304207 | A1 * | 9/2021 | Lo Faro | G06Q 40/02 |
| 2022/0374524 | A1 * | 11/2022 | Pandey | G06F 21/552 |
| 2024/0171558 | A1 * | 5/2024 | Diffloth | H04L 63/08 |
| 2025/0103898 | A1 * | 3/2025 | Zhao | G06N 3/045 |

FOREIGN PATENT DOCUMENTS

EP 3822895 A1 5/2021

OTHER PUBLICATIONS

Da Silva, Richard, "Calls for Behavioural Biometrics as Bank Fraud Soars", Biometric Technology Today, Somerton, GB, vol. 2021, No. 9, Sep. 2021, pp. 7-9, XP086792002,ISSN: 0969-4765, DOI: 10.1016/S0969-4765(21 )00095-3 [retrieved on Sep. 22, 2021].
Smiles, Anita J., et al. "Data Mining based Hybrid Latent Representation Induced Ensemble Model Towards Fraud Prediction", 2020 3rd ICISS, IEEE, Dec. 3, 2020, pp. 376-382, XP033878840,DOI: 10.1109/ICISS49785.2020.9316080 [retrieved on Jan. 5, 2021], Dec. 3, 2020.
Extended European Search Report from European Patent Application No. 24167275.7 mailed Sep. 27, 2024, pp. 1-10.

* cited by examiner

*Primary Examiner* — Kostas J Katsikis
(74) *Attorney, Agent, or Firm* — Perkins Coie LLP

(57) ABSTRACT

Various implementations generally relate to systems and methods for collecting application use data generated based on interactions by a user with one or more applications of an enterprise computer system and upon receiving a request from the user to perform an action related to a customer account, applying a trained machine learning model to the application use data and the request to predict a likelihood that the request is fraudulent.

20 Claims, 6 Drawing Sheets

500

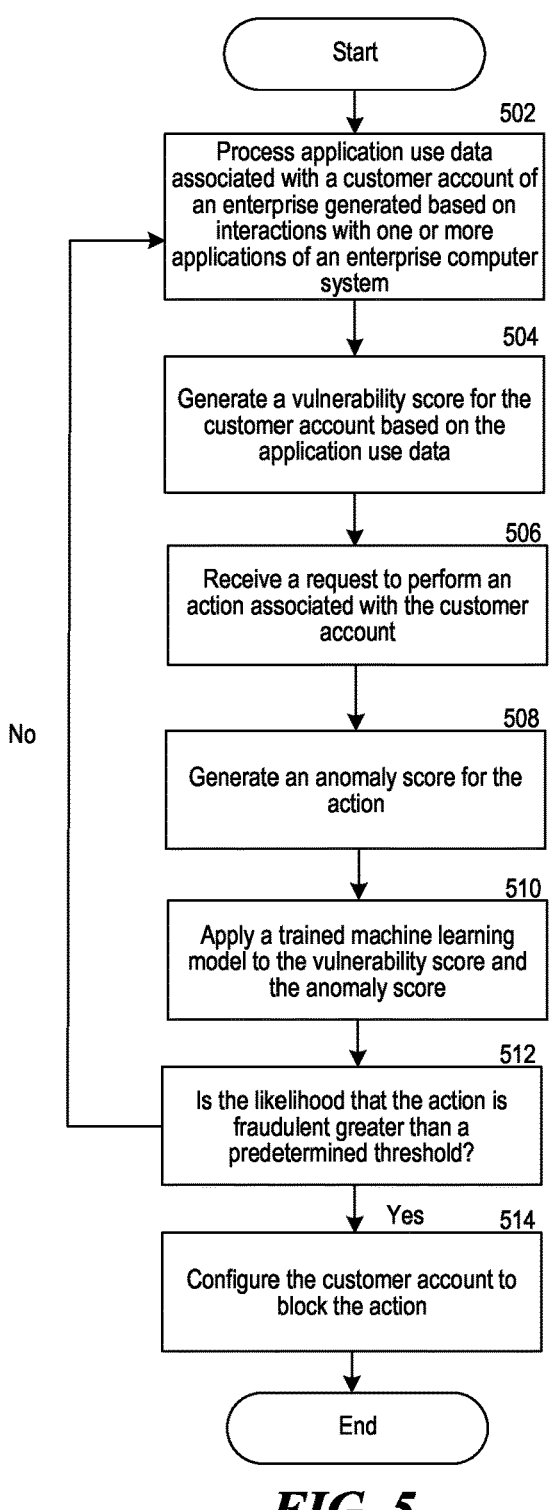

```
                    ┌─────────────┐
                    │    Start    │
                    └──────┬──────┘
                           │                   502
                           ▼
         ┌─────────────────────────────────────┐
         │ Process application use data          │
         │ associated with a customer account of │
    ┌───▶│ an enterprise generated based on      │
    │    │ interactions with one or more         │
    │    │ applications of an enterprise computer│
    │    │ system                                │
    │    └─────────────────┬─────────────────────┘
    │                      │                   504
    │                      ▼
    │    ┌─────────────────────────────────────┐
    │    │ Generate a vulnerability score for the│
    │    │ customer account based on the         │
    │    │ application use data                  │
    │    └─────────────────┬─────────────────────┘
    │                      │                   506
    │                      ▼
    │    ┌─────────────────────────────────────┐
    │    │ Receive a request to perform an       │
    │    │ action associated with the customer   │
    │    │ account                               │
    │    └─────────────────┬─────────────────────┘
    │                      │                   508
    │                      ▼
    │    ┌─────────────────────────────────────┐
 No │    │ Generate an anomaly score for the     │
    │    │ action                                │
    │    └─────────────────┬─────────────────────┘
    │                      │                   510
    │                      ▼
    │    ┌─────────────────────────────────────┐
    │    │ Apply a trained machine learning      │
    │    │ model to the vulnerability score and  │
    │    │ the anomaly score                     │
    │    └─────────────────┬─────────────────────┘
    │                      │                   512
    │                      ▼
    │    ┌─────────────────────────────────────┐
    │    │ Is the likelihood that the action is  │
    └────│ fraudulent greater than a             │
         │ predetermined threshold?              │
         └─────────────────┬─────────────────────┘
                           │ Yes               514
                           ▼
         ┌─────────────────────────────────────┐
         │ Configure the customer account to     │
         │ block the action                      │
         └─────────────────┬─────────────────────┘
                           │
                           ▼
                    ┌─────────────┐
                    │     End     │
                    └─────────────┘
```

*FIG. 5*

THREAT IDENTIFICATION AND MITIGATION SYSTEM USING MACHINE LEARNING

BACKGROUND

Identity fraud is the use by one person of another person's personal information, without authorization, to commit a crime or to deceive or defraud that other person or a third person. One common type of identity fraud in the cyberspace, a SIM swap scam, also known as SIM splitting, Smishing, and SIM swapping, is a type of account takeover fraud that generally targets a weakness in two-factor authentication and two-step verification in which the second factor or step is a text message (SMS) or call placed to a mobile telephone.

The fraud exploits a mobile phone service provider's ability to seamlessly port a phone number to a device containing a different subscriber identity module (SIM). This mobile number portability feature is normally used when a phone is lost or stolen, or a customer is switching service to a new phone.

The scam begins with a fraudster gathering personal details about the victim, either by use of phishing emails, by buying them from organized criminals, or by directly socially engineering the victim. Armed with these details, the fraudster contacts the victim's mobile telephone provider. The fraudster uses social engineering techniques to convince the telephone company to port the victim's phone number to the fraudster's SIM. This is done, for example, by impersonating the victim using personal details to appear authentic and claiming that they have lost their phone.

BRIEF DESCRIPTION OF THE DRAWINGS

Detailed descriptions of implementations of the present invention will be described and explained through the use of the accompanying drawings.

FIG. 5 is a flowchart illustrating a process for detecting a fraud from a victim side upon receiving a user request to perform an action related to a customer account, according to some implementations.

Figure 1:
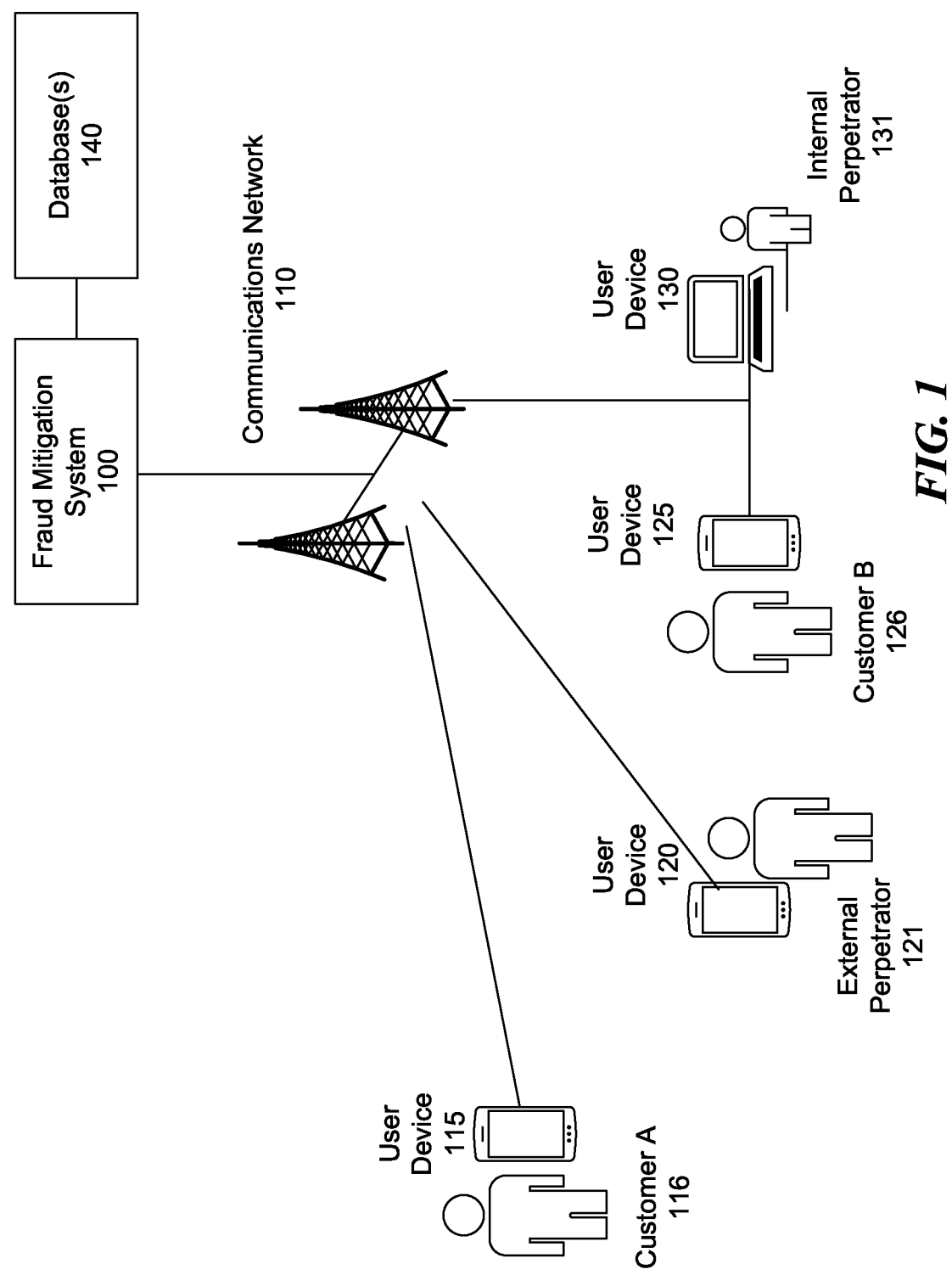
FIG. 1 is a block diagram that illustrates a fraud mitigation system 100 of an enterprise in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technologies address problems faced by enterprises, such as mobile phone service providers, in dealing with identity frauds associated with enterprise customers. Various implementations generally relate to systems and methods for collecting application use data generated based on interactions by a user with one or more applications of an enterprise computer system and upon receiving a request from the user to perform an action related to a customer account, applying a trained machine learning model to the application use data and the request to predict a likelihood that the request is fraudulent.

In some implementations, a fraud mitigation system is designed to detect fraud of an internal perpetrator. A fraud score module is configured to process application use data generated based on interactions by an enterprise employee with one or more applications of the enterprise computer system and generate a fraud score that indicates a likelihood that the enterprise employee will commit fraud against an enterprise of the enterprise computer system. In response to a request from the enterprise employee to perform an action associated with a customer account of the enterprise, an anomaly detection module generates an anomaly score for the request. The fraud mitigation system includes a fraud mitigation module configured to apply a trained machine learning model to the fraud score and the anomaly score to predict a likelihood that the request is fraudulent.

In other implementations, the fraud mitigation system is designed to detect fraud of an external perpetrator. A fraud score module is configured to process application use data generated based on interactions by a user, who is not an enterprise employee, with one or more applications on a user device and generate a fraud score that indicates a likelihood that the user will commit fraud against the enterprise. In response to a request from the user to perform an action associated with a customer account of the enterprise, an anomaly detection module generates an anomaly score for the request. The fraud mitigation system includes a fraud mitigation module configured to apply a trained machine learning model to the fraud score and the anomaly score to predict a likelihood that the request is fraudulent.

In other implementations, the fraud mitigation system predicts the likelihood of fraud from a victim's standpoint. A vulnerability score module generates a vulnerability score for a customer account based on application use data associated with the customer account of the enterprise. Upon receiving a request to perform an action associated with the customer account, an anomaly detection module generates an anomaly score for the request. A fraud mitigation module applies a trained machine learning model to the vulnerability score and the anomaly score to predict a likelihood that the request is fraudulent.

Implementations described herein use the application use data from one or more channels to accurately predict likely avenues of fraud, likely victims of fraud, or both. By monitoring both real-time application use data and patterns in a user's application use data over time, the fraud mitigation system is able to take near-immediate action to block access to an application that enables perpetuation of the fraud.

The description and associated drawings are illustrative examples and are not to be construed as limiting. This disclosure provides certain details for a thorough under-
standing and enabling description of these examples. One
skilled in the relevant technology will understand, however,
that the invention can be practiced without many of these
details. Likewise, one skilled in the relevant technology will
understand that the invention can include well-known struc-
tures or features that are not shown or described in detail, to
avoid unnecessarily obscuring the descriptions of examples.

FIG. 1 is a block diagram that illustrates a fraud mitiga-
tion system 100 of an enterprise in which aspects of the
disclosed technology are incorporated. As illustrated in FIG.
1, the fraud mitigation system 100 may include a commu-
nications network 110, one or more user devices 115, 120,
125, and 130 (such as a mobile phone, tablet computer,
desktop computer, wearable computing device, etc.), and
one or more databases 140.

The communications network 110 includes one or more
base stations, which is a type of network access node (NAN)
that can also be referred to as a cell cite, a base transceiver
station, or a radio base station. The communications network
110 enables the fraud mitigation system 100 to communicate
with user devices 115, 120, 125, and 130 by transmitting and
receiving data, requests, and commands. In some implemen-
tations, the communications network 110 include multiple
networks to facilitate communications between and among
the multiple networks.

The fraud mitigation system 100 receives real-time or
historical data describing interactions by the user devices
115, 120, 125, and/or 130 with computer applications asso-
ciated with an enterprise. User devices can be used by users
to interact with any of a variety of applications, including,
for example, mobile or desktop applications installed on the
user devices (e.g., email clients), applications installed in
facilities controlled by the enterprise (e.g., physical access
control systems), or applications that operate on an enter-
prise backend (e.g., a customer-facing website; an employee
Intranet; or employee-facing applications that enable
employees to make changes to customer accounts, complete
transactions for customers, or troubleshoot customer issues).
The fraud mitigation system 100 applies one or more models
in an ongoing manner to continually process application use
data across any or a combination of a variety of types of
applications, enabling the fraud mitigation system 100 to
detect and mitigate fraudulent activity related to the enter-
prise.

An example of the communications network 110 enabling
the fraud mitigation system 100 to communicate with the
user devices 115 and 120 is shown in FIG. 1. Customer A
116 is a customer of an enterprise who uses the user device
115 to perform various actions on an enterprise mobile
application. The actions can include paying monthly bills,
requesting to create a new account associated with the
customer account, requesting to purchase a phone, or
requesting SIM swap through the enterprise mobile appli-
cation in the user device 115. The actions of Customer A on
the enterprise mobile application are recorded as application
use data and transmitted to the fraud mitigation system 100
via the communications network 110. Where the action of
Customer A comprises an action related to the customer
account of the enterprise, such as SIM swap request or a new
account creation request, the action is marked as an account
action request which is also transmitted to the fraud miti-
gation system 100 via the communications network 110. The
fraud mitigation system 100 processes the transmitted appli-
cation use data and the account action request to predict a
likelihood that Customer A's account is involved with fraud.
Upon determining that Customer A's account is likely to be involved with fraud using a fraud detection model, the fraud
mitigation system 100 sends a command to an enterprise
computer system via the communications network 110 to
block Customer A's account action request.

In another example, the fraud mitigation system 100
receives an account action request for a SIM swap associ-
ated with Customer A 116 from the user device 120 of an
external perpetrator 121. Because the fraud mitigation sys-
tem 100 does not have information on whether the account
action request is from Customer A 116 or the external
perpetrator 121, the fraud mitigation system 100 runs a
routine process of analyzing the application use data and the
account action request using the modules to predict a
likelihood that Customer A's account is involved with fraud.
For example, upon determining that the user device 120
which was used to send the account request has no record of
actions associated with Customer A and discovering that the
last login associated with Customer A took place in San
Francisco five minutes ago whereas the account action
request was sent in New York, the fraud mitigation system
applies a trained machine learning model to determine that
the likelihood that the account action request is fraudulent is
high. The fraud mitigation system 100 send a command to
the enterprise computer system via the communication net-
work 110 to block the account action request and in some
implementations, block access of Customer A's account
from the user device 120.

In another example, the fraud mitigation system 100
receives an account action request associated with Customer
B 126 from the user device 130 of an internal perpetrator
131. The internal perpetrator 131 is an employee of the
enterprise whose job responsibilities include responding to
customer requests and handling billing of the enterprise.
Upon receiving the account request from the enterprise
employee, the fraud mitigation system 100 analyzes appli-
cation use data of the enterprise employee, the application
use data generated based on interactions by the enterprise
employee with one or more applications of the enterprise
computer system. If the application use data of the enterprise
employee includes repeated requests for access to Customer
B's personal information stored in the enterprise database
140 as well as nonexistence of communication between
Customer B and the enterprise employee, the fraud mitiga-
tion system 100 determines a likelihood that the enterprise
employee is an internal perpetrator within the enterprise
attempting to commit fraud against Customer B. The fraud
mitigation system 100 subsequently disables access of the
user device 130 of the internal perpetrator 131 to the one or
more applications enterprise computer system.

The fraud mitigation system 100 uses one or more trained
machine learning models to detect potential fraud, according
to various implementations. A "model," as used herein, can
refer to a construct that is trained using training data to make
predictions or provide probabilities for new data items,
whether or not the new data items were included in the
training data. For example, training data for supervised
learning can include items with various parameters and an
assigned classification. A new data item can have parameters
that a model can use to assign a classification to the new data
item. As another example, a model can be a probability
distribution resulting from the analysis of training data, such
as a likelihood of an n-gram occurring in a given language
based on an analysis of a large corpus from that language.
Examples of models include neural networks, support vector
machines, decision trees, Parzen windows, Bayes, cluster-
ing, reinforcement learning, probability distributions, decision trees, decision tree forests, and others. Models can be configured for various situations, data types, sources, and output formats.

In some implementations, a model used by the fraud mitigation system 100 can be a neural network with multiple input nodes that receive application use data as inputs. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer (the "output layer"), one or more nodes can produce a value classifying the input that, once the model is trained, can be used to detect whether the application use data is indicative that a user will commit a fraudulent act, that a user will be a victim of fraud, or that a requested action is likely to be fraudulent. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

One or more of the machine learning models described herein can be trained with supervised learning, where the training data includes application use data as input and a desired output, such as a classification as fraudulent or not fraudulent. A representation of a given user's behavior (e.g., as a set of application use data collected over a period of time) can be provided to the model. Output from the model can be compared to the desired output for that user's behavior and, based on the comparison, the model can be modified, such as by changing weights between nodes of the neural network or parameters of the functions used at each node in the neural network (e.g., applying a loss function). After applying each set of user behavior data in the training data and modifying the model in this manner, the model can be trained to evaluate new sets of application use data.

Figure 2:
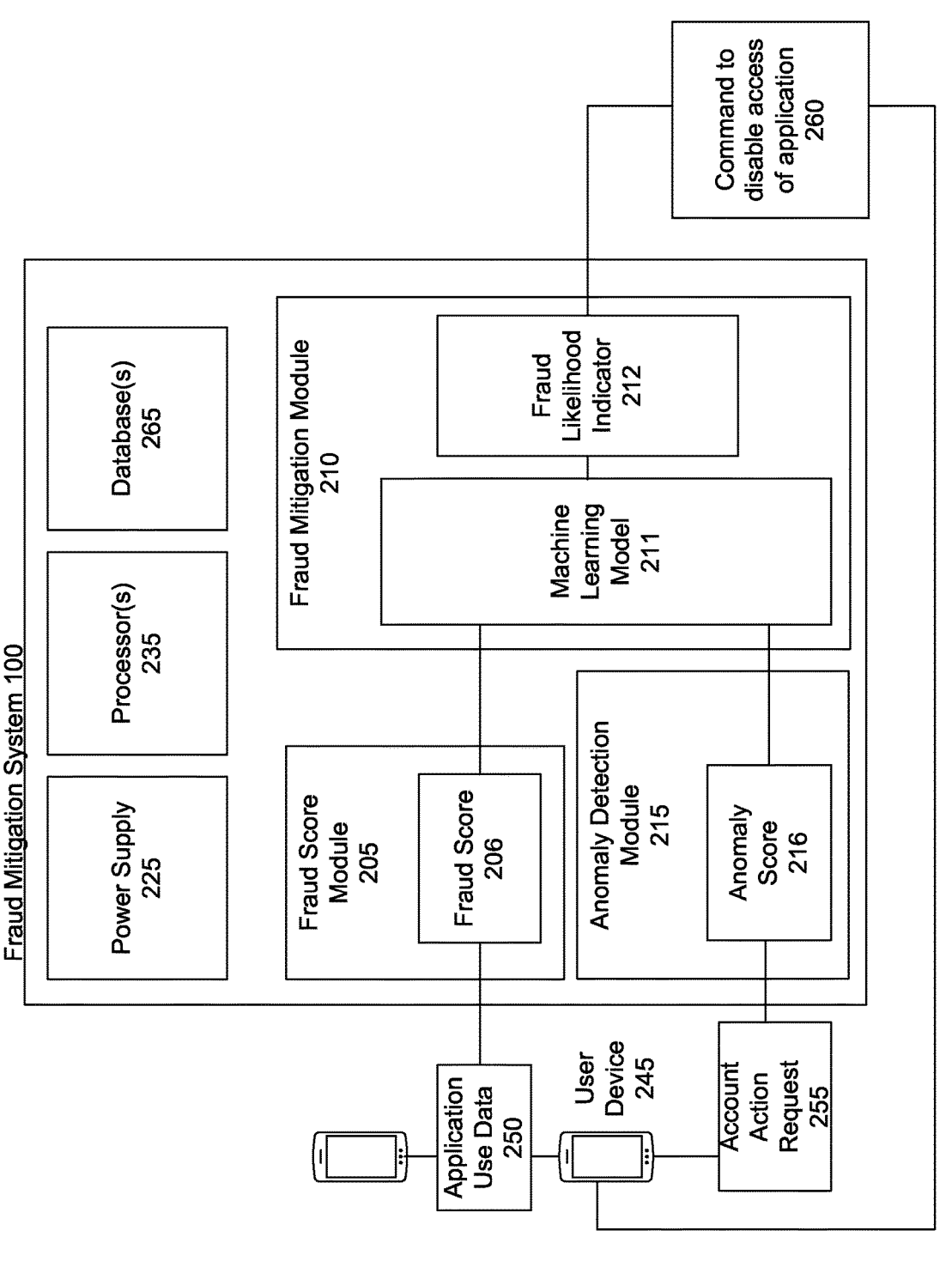
FIG. 2 is a block diagram illustrating functional modules executed by the fraud mitigation system, according to some implementations.

FIG. 2 is a block diagram illustrating functional modules executed by the fraud mitigation system 100 to detect likely perpetrators of fraud, according to some implementations. As shown in FIG. 2, the fraud mitigation system 100 includes a fraud score module 205, a fraud mitigation module 210, and an anomaly detection module 215. Other implementations of the fraud mitigation system 100 include additional, fewer, or different modules, or distribute functionality differently between the modules. As used herein, the term "module" refers broadly to software components, firmware components, and/or hardware components. Accordingly, the modules 205, 210, and 215 could each be comprised of software, firmware, and/or hardware components implemented in, or accessible to, the fraud mitigation system 100. The fraud mitigation system 100 also includes power supply 225, one or more processors 235, and one or more databases 265.

The process of detecting fraud by the fraud mitigation system 100 begins with collection of application use data 250 that is generated based on interactions by a user with one or more applications of an enterprise computer system. A user as described in FIG. 2 can be, for example, an employee of an enterprise performing work of the enterprise (e.g., a store employee). In some implementations, the user refers to a person or computing system outside of the enterprise (e.g., a customer of the enterprise or a bot). Examples of the one or more applications of the enterprise computer system include Intranet, physical access control systems (PACS), and enterprise mobile applications on a user device 245.

The enterprise Intranet is a private network within the enterprise that is used to securely share information and resources among employees. The enterprise Intranet can function as a central repository where important information and private enterprise data are stored. The enterprise Intranet can also function as a mode of collaboration by providing platforms for communication among employees, such as enterprise email application or enterprise instant messengers. The enterprise Intranet can also facilitate transactions in some implementations, such as enabling an employee to place an order for a product on behalf of a customer.

PACS are access control systems designed to grant or limit access of individuals to enterprise buildings. Federal government compliant PACS solutions typically include three components, which are the PACS infrastructure of interoperable software and hardware components, certificate validation system that performs identification and authentication of individuals using an identification card, and a card reader that interacts with the identification cards via the certificate validation system. Enterprises that wish to ensure security of buildings or areas within buildings implement the certificate validation system to enable only individuals with valid identification cards to enter secure buildings or secure areas within buildings. In some implementations, the card reader is replaced with a PIN pad, fingerprint sensors, or biometric sensors.

The enterprise mobile applications are applications designed to help enterprises support different areas of the businesses. The enterprise mobile applications include applications monitoring automatic billing systems, call center and customer support, messaging and collaboration among employees, resource planning and allocation within the enterprise. The enterprise mobile applications are installed on or accessed via user devices 245 of enterprise employees.

Depending on which of the one or more applications the user interacts with, types of the application use data 250 generated based on the interactions vary. In one implementation, the application use data is a record of activities performed by the user in the Intranet of the enterprise computer system. The activities may include processing a customer's order, sending instant messages to another user within the Intranet, responding to a customer support request, or sending private enterprise data to another user within the Intranet. The record may also include the user's request for access to private enterprise data.

In another implementation, the application use data is the user's access history of enterprise buildings with PACS implemented. For example, whenever the user badges into an enterprise workplace using an identification card that identifies a particular user, the PACS records the user's actions accordingly.

In another implementation, the application use data is a record of activities performed by the user in the enterprise mobile applications in the user device. The user's activities on the mobile applications are recorded as the application use data. User activities on the mobile applications may include messaging and collaborating with other users of the mobile applications, responding to call center and customer support requests, and processing payments by customers.

As the application use data 250 is continuously generated based on interactions between the user and the one or more applications of the enterprise computer system, the user, through the user device 245, sends account action requests

255 to the enterprise computer system. When the enterprise is a telecommunications service provider, the account action requests 255 may include, for example, a request to purchase a mobile phone, a request for a SIM swap, or a request to create a new account associated with a customer account of the enterprise.

The fraud mitigation system 100 employs fraud score module 205 and anomaly detection module 215 to analyze a record of the generated application use data and the received account action request. The fraud score module 205 is configured to process the application use data generated based on the interactions by the user with one or more applications of the enterprise computer system. The fraud score module 205 then generates a fraud score 206 that indicates a likelihood that the user will commit fraud against the enterprise.

In some implementations, the fraud score module 205 employs a model that is configured to output the fraud score 206 when applied to at least the application use data. The model can be a rule-based model, a trained machine learning model, or a model that combines rule-based and machine learning-based techniques. Generally, the model can be configured to detect deviations in a user's application use data from expected patterns of use. Such deviations can be measured from a historical pattern of use by the same user, in order to detect, for example, sudden changes in a user's behavior that might be indicative of fraud. The model can additionally or alternatively measure deviations from patterns of use by other similar users, for example to detect that one employee of the enterprise is accessing data or using applications in a way that is atypical for employees with similar jobs.

The fraud score module 205 can be configured to generate fraud scores for a particular user on a continual or recurring basis. For example, the fraud score module 205 updates a user's fraud score on a daily, weekly, or monthly basis based on application use data collected from the user device.

In one example of generating fraud scores, the fraud score module 205 detects that employee A's application use data includes abnormal activities involving access of sensitive enterprise data, such as constant request of access to view a customer's personal information. Employee B's application use data, on the other hand, includes activities such as responding to customer requests through a call center and collaborating with other employees on an enterprise project. The fraud score module 205 may generate a higher fraud score 206 for employee A compared to the fraud score 206 for employee B.

The anomaly detection module 215 functions independently from the fraud score module 205 to analyze the account action request 255 received from the user device 245. After receiving the account action request 255 related to a customer account of the enterprise, the anomaly detection module 215 generates an anomaly score 216 for the action that indicates a degree of deviation of the action from expected activity associated with the customer account.

In some implementations, the anomaly detection module 215 employs a model that is configured to output the anomaly score 216 when applied to at least the account action request. The model can be a rule-based model, a trained machine learning model, a model that combines rule-based and machine learning-based techniques, or a table with preset scores based on records of fraud stored in the enterprise database 365. Generally, the model can be configured to detect deviations in the account action request from expected activities associated with the customer account. Such deviations can be measured from a historical pattern of actions by a customer of the customer account. The deviations can also be measured from a historical pattern of actions of the enterprise employee who made the account action request in order to detect, for example, sudden changes in the enterprise employee's behavior that might be indicative of fraud. The model can additionally or alternatively measure deviations from patterns of use by customers or enterprise employees in similar situations. For example, the model can detect that the enterprise employee is accessing data or making an account action request that is atypical for enterprise employees with similar jobs.

The anomaly detection module 215 can be configured to generate anomaly scores for all actions associated with a customer account. Alternatively, the anomaly detection module 215 can be configured to generate anomaly scores for predetermined set of actions related to account control, such as creating a new account associated with the customer account or a SIM swap request.

In one example of generating anomaly scores, upon receiving a request to purchase a phone associated with a customer account, the anomaly detection module 215 searches one or more databases 265 containing customer information to locate stored information of the customer associated with the request. The databases 265 may include information such as previous purchase histories of the customer that indicate the customer purchases a phone every two years and a recent report of a stolen device from the customer. With the information stored and located in the databases 265, the anomaly detection module 215 determines that the account action request to purchase a phone does not deviate greatly from expected activities associated with the customer account because of the recent report of a stolen device and generates the anomaly score 216 accordingly.

In another example, upon receiving a request to purchase two luxury phones associated with a customer account, the anomaly detection module 215 searches one or more databases 265 containing customer information to locate stored information of the customer associated with the request. The search returns purchase histories of the customer that indicate the customer purchases four budget friendly phones every two years, the last purchase taking place two weeks ago. After analyzing the purchase histories of the customer associated with the request, the anomaly detection module determines that the request to purchase two luxury phones deviates greatly from expected activity associated with the customer account and generates the anomaly score 216 accordingly.

After the fraud score module 205 and the anomaly detection module 215 generate the fraud score 206 and the anomaly score 216, respectively, a fraud mitigation module 210 of the fraud mitigation system 100 receives the fraud score 206 and the anomaly score 216. The fraud mitigation module 210 uses the fraud score 206 and the anomaly score 216 to predict a likelihood that the action is fraudulent.

In some implementations, the fraud mitigation module 210 predicts that an action is fraudulent if the fraud score 206 and the anomaly score 216 satisfy one or more specified criteria. For example, if the anomaly score 216 is greater than a first threshold (e.g., 85% or higher), the fraud mitigation module 210 outputs a prediction that the action is fraud. If the anomaly score 216 is below a second threshold (e.g., 20% or lower), the fraud mitigation module 210 predicts the action is not fraud. If the anomaly score 216 is between the first and second thresholds, the fraud mitigation module 210 uses the fraud score 206 in addition to the anomaly score to predict the likelihood of fraud. For example, a higher fraud score 206 in conjunction with a lower anomaly score may indicate that fraud is likely; whereas a higher anomaly score 216 in conjunction with a lower fraud score may not be a cause for concern.

In other implementations, the trained machine learning model 211 performs deep learning (also known as deep structured learning) directly on one or more databases of the fraud mitigation system 100 to learn more information about actions that are more likely to be associated with fraudulent actions. The fraud mitigation module 210 applies a trained machine learning model 211 to the fraud score 206 and anomaly score 216 to predict the likelihood that the action is fraudulent. In some implementations, the trained machine learning model 211 uses fraud scores and anomaly scores of past frauds as training data in order to predict that an action is fraudulent. For example, using the training data, the trained machine learning model 211 determines that the anomaly score 216 greater than a preset threshold makes it likely that the action is fraud, independent of analysis of the fraud score 206. Similarly, the trained machine learning model 211 also determines that the fraud score 206 greater than a preset threshold makes it likely that the action is fraud, independent of analysis of the anomaly score 216. In other implementations, the trained machine learning model 211, in addition to the fraud scores and the anomaly scores, takes into account other variables such as changes in the fraud score leading up to the time the account action request is received. For example, in response to an increasing trend in the fraud score leading up to the time the account action request is made, the trained machine learning model 211 determines that the action is more likely to be fraud. If, however, the fraud score was originally higher but showed a significantly decreasing trend, the trained machine learning model 211 determines that the action is less likely to be fraud.

After predicting the likelihood of fraud, the fraud mitigation module 210 generates a fraud likelihood indicator 212. In some implementations, the fraud mitigation system 100 compares the fraud likelihood indicator 212 to a predetermined threshold, and where the likelihood of fraud is greater than the predetermined threshold, the fraud mitigation system 100 generates a command to the enterprise computer system to mitigate the likely fraud. Fraud mitigation can entail, for example, blocking the action that is predicted to be fraud, blocking one or more additional actions requested by the same user, or disabling access of the user to the one or more applications of the enterprise computer system. In other implementations where the likelihood of fraud is lower than the predetermined threshold, the fraud mitigation system 100 does not generate a command to the enterprise computer system to disable user access. Instead, the fraud mitigation system 100 stores the record of the fraud mitigation process in the database 265 for deep learning on the trained machine learning model 211.

Figure 3:
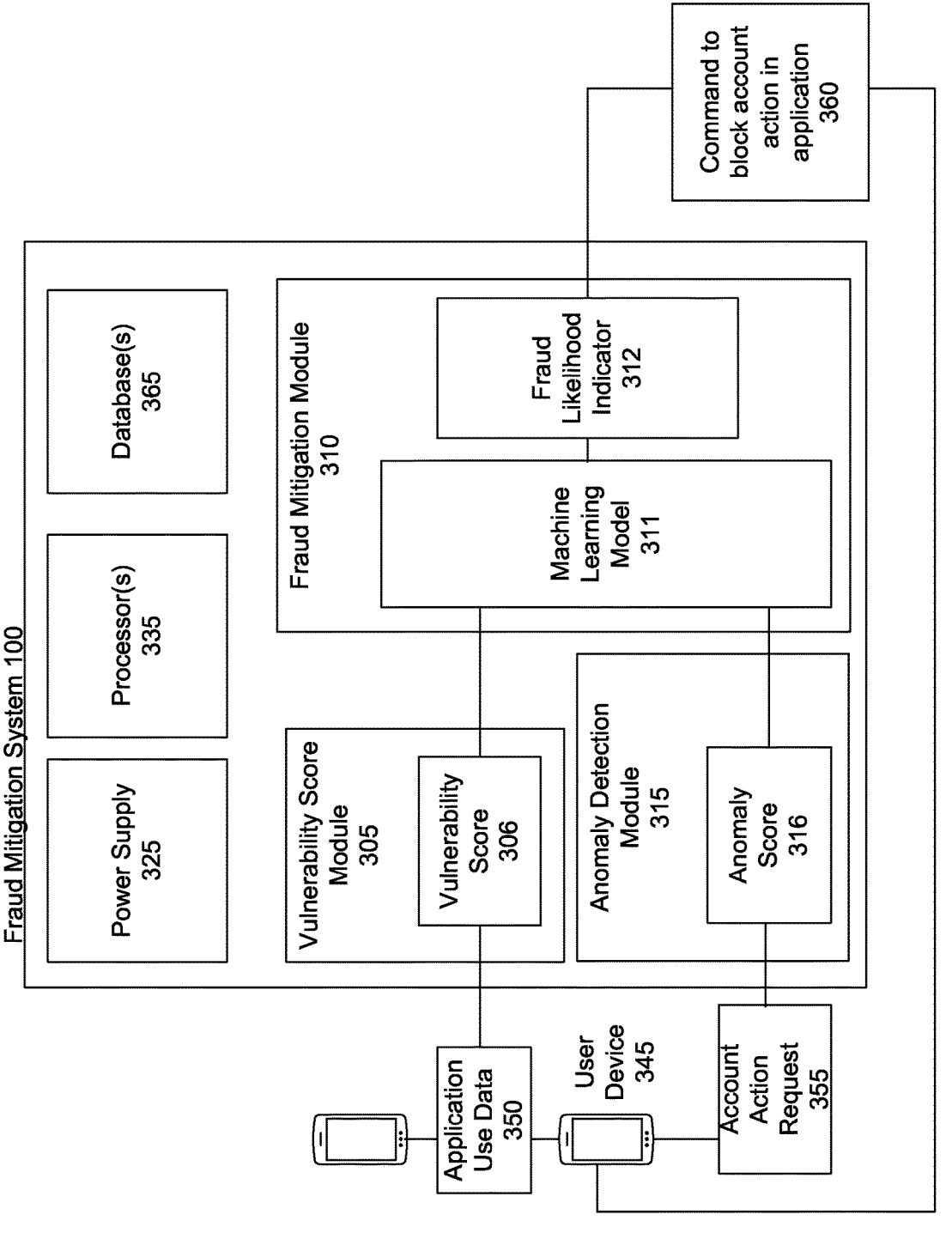
FIG. 3 is a block diagram illustrating functional modules executed by the fraud mitigation system to detect fraud from a victim's standpoint, according to some implementations.

FIG. 3 is a block diagram illustrating functional modules executed by the fraud mitigation system 100 to detect fraud from a victim's standpoint, according to some implementations. As shown in FIG. 3, the fraud mitigation system 100 includes a vulnerability score module 305, a fraud mitigation module 310, and an anomaly detection module 315. Other implementations of the fraud mitigation system 100 include additional, fewer, or different modules, or distribute functionality differently between the modules. The fraud mitigation system 100 also includes power supply 325, one or more processors 335, and one or more databases 365.

The process of detecting fraud from a victim's standpoint by the fraud mitigation system 100 begins with collection of application use data 350 associated with a customer account of an enterprise that is generated based on interactions by a user with one or more applications of an enterprise computer system. Examples of the one or more applications of the enterprise computer system include Intranet, physical access control systems (PACS), and enterprise mobile applications on a user device 345. The one or more applications of the enterprise computer system which are described in detail above with respect to FIG. 2 are applicable to FIG. 3.

Depending on which of the one or more applications the user interacts with, types of the application use data 350 associated with the customer account of the enterprise generated based on the interactions vary. In one implementation, the application use data is a record of activities associated with the customer account stored in the Intranet of the enterprise computer system. The activities may include previous customer support requests and previous purchase records of the customer account. The record may also include previous successful or unsuccessful fraud attempts associated with the customer account.

In another implementation, the application use data is a record of activities performed by the customer of the customer account in the enterprise mobile applications in the user device. The customer's activities on the mobile applications are recorded as the application use data. Customer activities on the mobile applications may include submitting customer support requests, making payments, and placing a purchase order.

As the application use data 350 associated with the customer account is continuously generated based on interactions between the user and the one or more applications of the enterprise computer system, the user, through the user device 345, sends an account action request 355 to the enterprise computer system. In some implementations, the user is an employee of the enterprise who sends the account action request 355 in response to receiving a request from the customer associated with the customer account. In other implementations, the user is the customer of the customer account sending the account action request 355 without assistance of the enterprise employee. The account action requests 355 may include a request to purchase a mobile phone, a request for a SIM swap, or a request to create a new account associated with the customer account of the enterprise.

In the implementation illustrated in FIG. 3, the fraud mitigation system 100 employs vulnerability score module 305 and anomaly detection module 315 to analyze a record of the generated application use data associated with the customer account and the received account action request. The vulnerability score module 305 is configured to process the application use data associated with the customer account generated based on the interactions by the user with one or more applications of the enterprise computer system. The vulnerability score module 305 then generates a vulnerability score 306 that indicates a likelihood that the customer of the customer account will be the target of fraud.

In some implementations, the vulnerability score module 305 employs a model that is configured to output the vulnerability score 306 when applied to at least the application use data of the customer of the customer account. The model can be a rule-based model, a trained machine learning model, or a model that combines rule-based and machine learning-based techniques. Generally, the model can be configured to detect deviations in the customer's application use data from expected patterns of use. Such deviations can be measured from a historical pattern of use by the same customer, in order to detect, for example, sudden changes in a customer's behavior that might be indicative of fraud. The model can additionally or alternatively measure deviations from patterns of use by other similar customers. For example, the model compares the customer's application use data with records of other customers' application use data and fraud history to determine that the customer's application use data does not deviate from application use data of victims of fraud.

In some implementations, the vulnerability score module 305 processes customer profile data in addition to the application use data in order to generate the vulnerability score 306. Customer profile data can include, for example, age, socioeconomic status, address, and/or purchase history associated with the customer. For example, the model employed by the vulnerability score module 305 can, using records of fraud as training data, determine that a particular user is likely to be more susceptible to fraud based in part on the user's age, and generate the vulnerability score 306 accordingly.

In some implementations, the vulnerability score module 305 uses application use data to predict a mental state of a corresponding user, as another input to the model used to generate vulnerability scores. For example, based on patterns of use of a user device, the vulnerability score module 205 predicts that a given user is suffering from depression, which may increase the user's vulnerability score. As another example, based on a low amount of incoming and outgoing calls and text messages, the vulnerability score module 205 predicts that the corresponding user is suffering from sadness and depression. A sharp increase in the amount of incoming and outgoing calls and text messages can be associated with mania or hypomania.

In some implementations, the vulnerability score module 305 uses physical movement data to predict a mental state of a corresponding user. The physical movement data can be generated on the user device of the corresponding user. Hesitation in movement can imply neuroticism and the vulnerability score module 205 assigns the user's vulnerability score accordingly.

In other implementations, the vulnerability score module 305 uses location data to predict a mental state of the corresponding user. The location data can be used to infer the corresponding user's affiliations with groups and organizations that may leave the user more vulnerable to fraudulent actions. The location data can also be used to predict the corresponding user's characteristics such as openness and extroversion.

In other embodiments, the vulnerability score module 305 uses text data to predict a mental state of the corresponding user. Investigation of text messages can reveal the corresponding user's emotions such as anger, anxiety, sadness, joy, and disgust. The corresponding user's personality traits such as openness, conscientiousness, extroversion, agreeableness, neuroticism, and honesty can also be inferred from the investigation of text messages. The vulnerability score module 305 assigns the corresponding user's vulnerability score based on the investigation of text messages.

For example, the application use data of customer A includes a record indicating that customer A has not changed the account password in the past year. The application use data of customer A also indicates that customer A has not set up multi-factor authentication to enhance account security. On the other hand, the application use data of customer B indicates a record of customer B changing the account password every three months and an indication that customer B has set up multi-factor authentication. The vulnerability score module 305 would generate a higher vulnerability score 306 for customer A compared to the vulnerability score 306 for customer B based on analysis of the application use data associated with the customer accounts.

The anomaly detection module 315 functions independently from the vulnerability score module 305 to analyze the account action request 355 received from the user device 345. After receiving the account action request 355 related to a customer account of the enterprise, the anomaly detection module 315 generates an anomaly score 316 for the action that indicates a degree of deviation of the action from expected activity associated with the customer account.

For example, upon receiving a request to purchase a phone associated with a customer account, the anomaly detection module 315 searches one or more databases 365 containing customer information to locate stored information of the customer associated with the request. The databases 365 may include information such as previous purchase histories of the customer that indicate the customer purchases a phone every two years and a recent port of a stolen device from the customer. With the information stored and located in the databases 365, the anomaly detection module 315 determines that the account action request to purchase a phone does not deviate greatly from expected activities associated with the customer account because of the recent report of a stolen device and generates the anomaly score 316 accordingly.

In another example, upon receiving a request to purchase two luxury phones associated with a customer account, the anomaly detection module 315 searches one or more databases 365 containing customer information to locate stored information of the customer associated with the request. The search returns purchase histories of the customer that indicate the customer purchases four budget friendly phones every two years, the last purchase taking place two weeks ago. After analyzing the purchase histories of the customer associated with the request, the anomaly detection module determines that the request to purchase two luxury phones deviates greatly from expected activity associated with the customer account and generates the anomaly score 316 accordingly.

After the vulnerability score module 305 and the anomaly detection module 315 generate the vulnerability score 306 and the anomaly score 316, respectively, a fraud mitigation module 310 of the fraud mitigation system 100 receives the vulnerability score 306 and the anomaly score 316. The fraud mitigation module 310 applies a trained machine learning model 311 to the vulnerability score 306 and the anomaly score 316 to predict a likelihood that the action is fraudulent. In one implementation, the trained machine learning model 311 performs deep learning directly on one or more databases of the fraud mitigation system 100 to learn more information about actions that are more likely to be associated with fraudulent actions.

After predicting the likelihood of fraud, the fraud mitigation module 310 generates a fraud likelihood indicator 312. In some implementations, the fraud mitigation system 100 compares the fraud likelihood indicator 312 to a predetermined threshold, and where the likelihood of fraud is greater than the predetermined threshold, the fraud mitigation system 100 generates a command to the enterprise computer system to block the action associated with the customer account. In other implementations, the fraud mitigation system 100 generates a flag on the customer account associated with potential fraud and generates a report in the enterprise computer system for review by enterprise employees. In other implementations where the likelihood of fraud is lower than the predetermined threshold, the fraud mitigation system 100 does not generate a command to the enterprise computer system to block the action associated with the customer account. Instead, the fraud mitigation system 100 stores the record of the fraud mitigation process in the database 365 for deep learning on the trained machine learning model 311.

Figure 4:
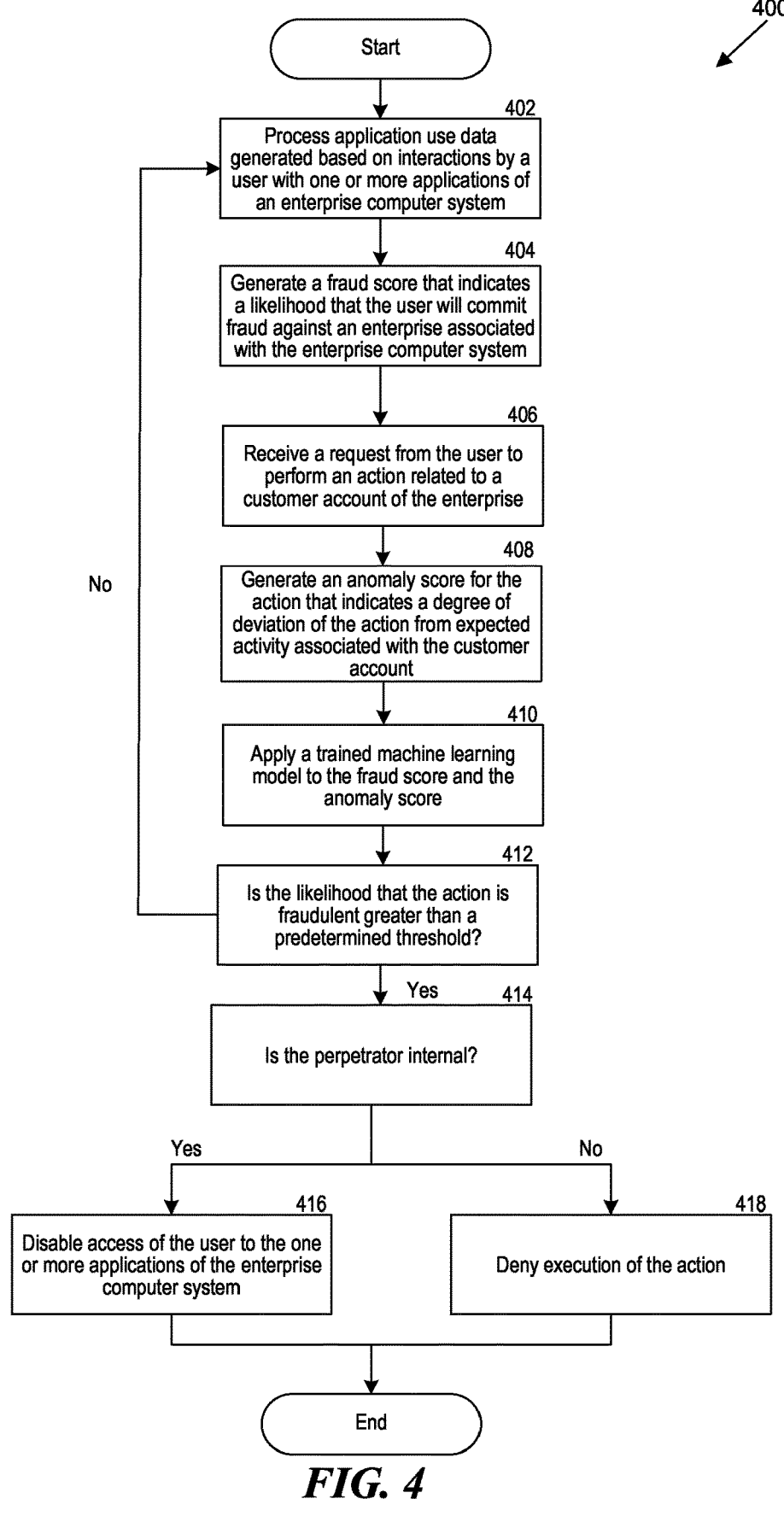
FIG. 4 is a flowchart illustrating a process for detecting a fraud by a perpetrator upon receiving a user request to perform an action related to a customer account, according to some implementations.

FIG. 4 is a flowchart illustrating a process 400 for detecting a fraud by a perpetrator upon receiving a user request to perform an action related to a customer account. The process 400 can be performed by the fraud mitigation system 100, in some implementations. Other implementations of the process 400 include additional, fewer, or different steps, or perform the steps in different orders.

In step 402, the fraud mitigation system 100 processes application use data generated based on interactions by a user with one or more applications of an enterprise computer system. Examples of the one or more applications of the enterprise computer system include Intranet, physical access control systems, and an enterprise mobile application on a user device. In one implementation, the application use data is a record of activities performed by the user in the Intranet of the enterprise computer system. In another implementation, the application use data is the user's access history of a physical space. For example, whenever the user badges into an enterprise workplace using a physical access control system installed in an enterprise building, the enterprise computer system records the user's actions accordingly. In another implementation, the application use data is a record of activities performed by the user in the user device. The user device can be a mobile application of an enterprise, and the user's activities on the mobile application are recorded as the application use data.

In step 404, based on the processed application use data, the fraud mitigation system 100 generates a fraud score that indicates a likelihood that the user will commit fraud against the enterprise associated with the enterprise computer system. Factors affecting the fraud score include abnormal patterns in the application use data such as abnormal login activity on a user device or on the enterprise Intranet or access to physical access control systems at off-work hours.

In step 406, the fraud mitigation system 100 receives a request from the user to perform an action related to a customer account of the enterprise. In one implementation, the action related to the customer account of the enterprise is a user request to purchase a phone. In another implementation, the action related to the customer account of the enterprise is a user request to perform a subscriber identity module (SIM) swap. In another implementation, the action related to the customer account of the enterprise is a user request to create a new customer account linked to the customer account.

In step 408, the fraud mitigation system 100 generates an anomaly score for the action that indicates a degree of deviation of the action from expected activity associated with the customer account. In one implementation, the anomaly detection module generates the anomaly score by accessing a look-up table that maps action types to predetermined anomaly scores for user performed actions. For example, the look-up table has a preassigned anomaly score for a user request to purchase a new phone within thirty days of the user's last phone purchase date. In another implementation, the anomaly detection module generates the anomaly score by assessing if a location at which the action is performed is possible based on location history associated with the customer account. For example, the anomaly score for a user request to purchase a phone in San Francisco when most recent activities associated with the customer account, the activities having been performed only a few minutes prior to the purchase request, were performed in New York would be different from the anomaly score for a user request to purchase a phone in Los Angeles when most recent activities associated with the customer account were also performed in Los Angeles. In another implementation, the anomaly detection module generates the anomaly score based by determining whether the user performed action appear anomalous based on customer attributes. For example, the anomaly detection module, upon identifying the customer as a head of the household who purchases four affordable phones every two years, would mark as anomalous a user request to purchase five brand new phones when it has only been six months since the customer made the regular purchase of four affordable phones.

In step 410, the fraud mitigation system 100 applies a trained machine learning model to the fraud score and the anomaly score to predict a likelihood that the action is fraudulent. In step 412, the fraud mitigation module assesses if the likelihood that the action is fraudulent is greater than a predetermined threshold. If the fraud mitigation module determines that the likelihood that the action is fraudulent is lower than the predetermined threshold, the fraud mitigation module restarts the fraud mitigation process by returning to step 402 to process another application use data. In some implementations, upon determining that the likelihood that the action is fraudulent is lower than the predetermined threshold, the fraud mitigation module signals the enterprise computer system to proceed with the user request to perform the action.

Upon determining that the likelihood that the action is fraudulent is higher than the predetermined threshold, the fraud mitigation system 100 proceeds to step 414. In step 414, the fraud mitigation system determines if the perpetrator is an internal perpetrator or an external perpetrator. In step 416, upon determining that the perpetrator Is an internal perpetrator, the fraud mitigation system disables access of the user to the one or more applications of the enterprise computer system. In some implementations, the fraud mitigation system generates a report that includes history of the fraud mitigation process, information regarding the detected fraud, and the identity of the internal perpetrator. The report is automatically sent to individuals in the enterprise with authority to handle internal frauds. In step 418, upon determining that the perpetrator is an external perpetrator, the fraud mitigation system denies execution of the action requested by the user. In some implementations, the fraud mitigation system generates a report of the attempted fraud to be reported to outside authorities.

FIG. 5 is a flowchart illustrating how a fraud mitigation system detects a fraud from a victim side upon receiving a user request to perform an action related to a customer account. The fraud mitigation system includes a vulnerability score module, an anomaly detection module, and a fraud mitigation module. In step 502, the fraud score module processes application use data generated based on interactions by a user with one or more applications of an enterprise computer system. Similar to step 402 of FIG. 4, examples of the one or more applications of the enterprise computer system include Intranet, physical access control systems, and a user device.

In step 504, based on the processed application use data, the fraud mitigation system 100 generates a fraud score that indicates a likelihood that the user will commit fraud against the enterprise associated with the enterprise computer system. Factors affecting the vulnerability score include abnormal patterns in the application use data such as abnormal login activity on a user device or abnormal user activity on the one or more applications of the enterprise computer system. The fraud mitigation system 100 can also generate the vulnerability score by detecting a psychological state of the user associated with the customer account based on the application use data.

Steps 506 and 508 are similar to steps 406 and 408 of FIG. 4. Various implementations associated with steps 406 and 408 discussed above are also applicable to steps 506 and 508, respectively. In step 506, the fraud mitigation system 100 receives a request from the user to perform an action related to a customer account of the enterprise. In step 508, the fraud mitigation system 100 generates an anomaly score for the action that indicates a degree of deviation of the action from expected activity associated with the customer account.

In step 510, the fraud mitigation system 100 applies a trained machine learning model to the vulnerability score and the anomaly score to predict a likelihood that the action is fraudulent. In step 512, the fraud mitigation system 100 assesses if the likelihood that the action is fraudulent is greater than a predetermined threshold. If the fraud mitigation system 100 determines that the likelihood that the action is fraudulent is lower than the predetermined threshold, the fraud mitigation system 100 restarts the fraud mitigation process by returning to step 502 to process another application use data. In some implementations, upon determining that the likelihood that the action is fraudulent is lower than the predetermined threshold, the fraud mitigation system 100 signals the enterprise computer system to proceed with the user request to perform the action.

In step 514, upon determining that the likelihood that the action is fraudulent is higher than the predetermined threshold, the fraud mitigation system 100 configures the customer account to block the action. For example, the fraud mitigation module can set a flag on the customer account that will deny any sale of a new phone. In another example, the fraud mitigation system 100 can set a flag on the customer account that will deny creation of any new account associated with the customer account until further identification action is taken by the user.

Computer System

Figure 6:
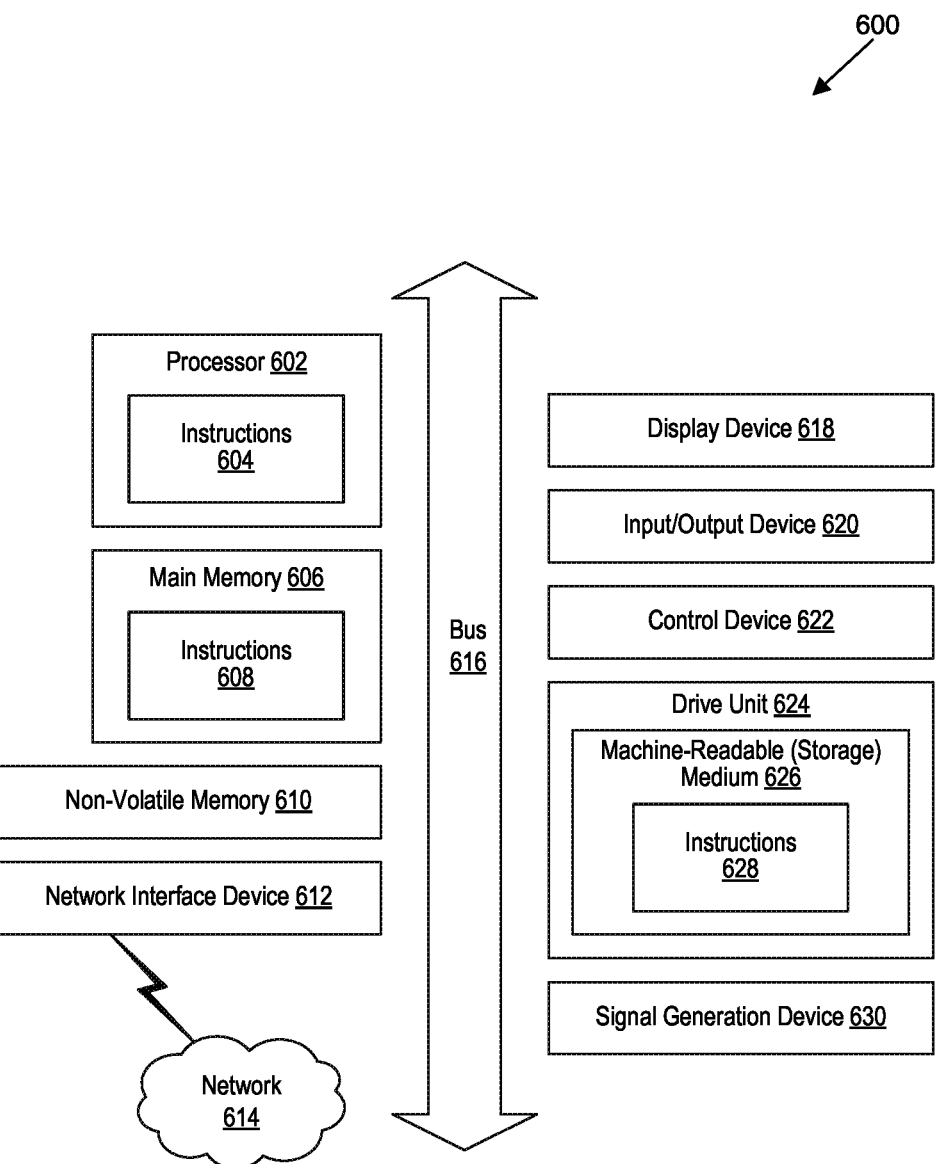
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A system comprising:

at least one hardware processor; and at least one non-transitory memory storing instructions that, when executed by the at least one hardware processor, cause the system to:

process application use data generated based on interactions by a user with one or more applications of an enterprise computer system;

generate, based on the application use data, a fraud score that indicates a likelihood that the user will commit fraud against an enterprise associated with the enterprise computer system;

receive, subsequent to generating the fraud score, a request from the user to perform an action related to a customer account of the enterprise, wherein the request comprises a request for a SIM swap;

generate an anomaly score for the action that indicates a degree of deviation of the action from expected activity associated with the customer account, wherein the anomaly score is generated independently from the fraud score;

apply a trained machine learning model to the fraud score and the anomaly score to predict a likelihood that the action is fraudulent; and disable access of the user to the one or more applications of the enterprise computer system when the likelihood is greater than a threshold.

2. The system of claim 1, wherein the one or more applications of the enterprise computer system include Intranet, physical access systems, or enterprise mobile applications on a user device.

3. The system of claim 1, wherein generating the anomaly score comprises:

determining whether the action is anomalous based on customer attributes.

4. The system of claim 1, wherein the application use data includes Intranet login history, access history to physical access systems, or enterprise mobile application login history.

5. The system of claim 1, wherein generating the fraud score comprises:

applying a rule-based model or a trained machine learning model to detect deviations in the application use data.

6. The system of claim 1, wherein generating the anomaly score comprises:

accessing a look-up table that maps action types to anomaly scores.

7. The system of claim 1, wherein generating the anomaly score comprises:

detecting if a location at which the action is performed is possible based on location history associated with the customer account.

8. A method comprising:

processing, by an enterprise computer system, application use data that is generated based on interactions by a user with one or more applications of the enterprise computer system to generate a fraud score, wherein the fraud score indicates a likelihood that the user will commit fraud against an enterprise associated with the enterprise computer system;

generating, by the enterprise computer system, an anomaly score for an action requested by the user, wherein the anomaly score is generated independently of the fraud score, wherein the action comprises purchasing a mobile phone;

applying, by the enterprise computer system, a trained machine learning model to the fraud score and the anomaly score to output a prediction indicating whether the requested action is fraudulent; and denying, by the enterprise computer system, execution of the action when the prediction indicates the requested action is fraudulent.

9. The method of claim 8, wherein generating the anomaly score comprises:

detecting if a location at which the action is requested is possible based on location history associated with the user.

10. The method of claim 8, further comprising:

executing, by the enterprise computer system, the action when the prediction indicates the requested action is not fraudulent.

11. The method of claim 8, wherein the one or more applications of the enterprise computer system include Intranet, physical access systems, or enterprise mobile applications on a user device.

12. The method of claim 8, wherein generating the anomaly score comprises:

accessing a look-up table that maps action types to anomaly scores.

13. The method of claim 8, wherein the application use data includes Intranet login history, access history to physical access systems, and enterprise mobile application login history.

14. The method of claim 8, wherein generating the fraud score comprises:

applying a rule-based model or a trained machine learning model to detect deviations in the application use data.

15. A non-transitory computer-readable storage medium storing executable instructions, the instructions when executed by one or more processors causing the one or more processors to:

process application use data associated with a customer account of an enterprise, the first application use data generated based on interactions with one or more applications of a computer system associated with the enterprise;

generate a vulnerability score for the customer account based on the first application use data, wherein the vulnerability score indicates a likelihood that the customer account will be a target of fraud;

receive a request to perform an action associated with the customer account;

generate an anomaly score for the action, wherein the anomaly score is generated independently from the vulnerability score;

apply a trained machine learning model to the vulnerability score and the anomaly score to predict a likelihood that the action is fraudulent; and configure the customer account to block the action when the likelihood is greater than a threshold.

16. The non-transitory computer-readable storage medium of claim 15, wherein the action comprises a request to access an enterprise computer system to perform a SIM swap, a request to access the enterprise computer system to create a new customer account related to the customer account of the enterprise, or a request to make a purchase related to the customer account.

17. The non-transitory computer-readable storage medium of claim 15, wherein generating the anomaly score comprises:

detecting if a location at which the action is performed is possible based on location history associated with the customer account.

18. The non-transitory computer-readable storage medium of claim 15, wherein generating the vulnerability score comprises:

detecting a psychological state of a customer associated with the customer account based on the application use data.

19. The non-transitory computer-readable storage medium of claim 15, wherein generating the vulnerability score comprises:

applying a rule-based model or a trained machine learning model to detect deviations in the application use data of a customer of the customer account.

20. The non-transitory computer-readable storage medium of claim 15, wherein generating the vulnerability score comprises:

applying a trained machine learning model to customer attributes, wherein the customer attributes include age, socioeconomic status, address, and purchase history associated with the customer; and processing the customer attributes to determine whether a particular customer attribute indicates greater vulnerability.

* * * * *